Sept. 17, 1963     A. KLAPP     3,104,020
APPARATUS FOR GASIFICATION OF FINELY DIVIDED SOLID FUELS
Filed March 13, 1961
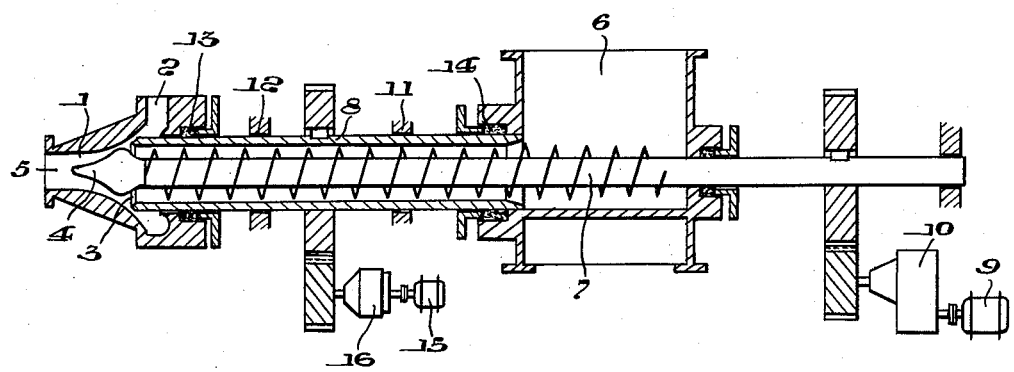
INVENTOR.
ARNOLD KLAPP
BY
Leo I. MaLossi.
his
ATTORNEY.

3,104,020
APPARATUS FOR GASIFICATION OF FINELY DIVIDED SOLID FUELS

Arnold Klapp, Essen, Germany, assignor, by mesne assignments, to Koppers Company, Inc., Pittsburgh, Pa., a corporation of Delaware
Filed Mar. 13, 1961, Ser. No. 95,227
5 Claims. (Cl. 214—17)

The gasification of finely divided, solid fuels with oxygen is frequently effected by placing the fuel in suspension in the stream of oxygen. This type of gasification consists in preparing as homogeneous as possible a suspension of the finely divided fuel in the oxygen introduced into the mixing zone and then injecting this suspension into a reaction space in which a high temperature prevails.

There are apparatus for affecting the suspension-gasification of finely divided, solid fuels with oxygen, in which apparatus the fuel is flowed through a screw conveyor into a mixing zone where the formation of the suspension of fuel and oxygen occurs.

The screw conveyor not only has the function of conveying the powdered fuel from a supply bunker into a mixing zone but also has the function of forming a gastight seal between the mixing zone and the bunker which seal prevents the oxygen which is under a certain excess pressure from flowing back into the bunker.

The formation of the sealing plug consisting of compressed powdered fuel takes place by a reciprocal action between the frictional forces on the one hand and the conveying force on the other hand. Therefore, the condition of the surface of the screw conveyor as well as the grain size of the fuel play a role.

It has been shown that it is most desirable to devise a screw conveyor which functions with all types of powdered fuel to provide both good transportation of the powdered fuel to the mixing apparatus as well as a satisfactory sealing effect of the fuel plug. The so-called flow properties of the dry powdered fuel depend upon and are greatly influenced by the grain size, the granular form and the dryness of the fuel, and also upon the mineral impurities in the fuel. If different fuels are to be gasified with one gasification apparatus, then it would normally hardly be possible to perform this with use of the same screw conveyor.

In order to correct this situation the present invention proposes constructing the screw conveyor for the fuel so that not only the screw itself but also the essentially cylindrical housing of the screw are rotatably arranged.

With the apparatus conforming to the invention it is now possible to control the relative friction inside the conveyor passage of the screw over wide limits by turning the housing of the screw in the same direction at the same or a different speed as the screw or also, if necessary, using a rotation in the opposite direction. The conditions which are to be maintained in regard to the rotary motions for achievement of the most favorable operating conditions are determined by a preliminary experiment by suitable adjustment of the relative motion of the housing and the screw to one another.

A preferred embodiment of the apparatus conforming to the invention is diagrammatiaclly illustrated in the drawing.

The finely divided, solid fuel is mixed with the oxygen in the mixing zone 1; the oxygen is introduced through line 2 and the powdered fuel is supplied through annular opening 3. The screw projects into the mixing zone or chamber 1 by means of a pear-shaped head 4. This head of the screw imparts to the mixing zone the form of a gradually widened annular space which can be regarded as particularly suitable for the preparation of homogeneous suspensions. The finished suspension is then introduced through line 5 into the gasification space (not illustrated).

The fuel passes through bunker 6 into the screw conveyor 7 which is enclosed in a housing 8. The screw conveyor itself is driven by a transmission 10 by means of a motor 9 through a suitable gear train.

The housing is rotatably mounted in bearings 11 and 12 and is sealed by stuffing-box seal 13 in the vicinity of the mixing zone and by stuffing-box seal 14 in the vicinity of the bunker.

Rotation of the housing 8 is effected by motor 15 and transmission 16, which constitute a conventional variable and reversible drive mechanism.

What is claimed:

1. In an apparatus for placing finely divided solid fuel in suspension in a gaseous medium in a mixing zone, the combination of a housing having a cylindrical bore, said housing being rotatably mounted with one open end thereof in a delivery zone and the other open end thereof in a zone for the supply of powdered fuel, said delivery zone being at a different pressure from the supply zone, a feed screw extending along said bore from the interior of said supply zone, first means for rotating said feed screw to advance powdered fuel from said supply zone to said delivery zone and second means independent of said first means for rotating said housing at variable speed relative to said feed screw, the speed of said second means being adjustable during operation of said feed screw.

2. An apparatus substantially as described in claim 1 wherein the second means is reversible whereby the housing may be rotated in a direction opposite to the direction of rotation of the feed screw.

3. In an apparatus for placing finely divided solid fuel in suspension in a mixing zone in a gaseous medium with a driven screw conveyor in a housing for transporting the powdered fuel to said mixing zone and packing the particles of powdered fuel sufficiently close together and sufficiently tight against the inner surface of the housing for said screw conveyor during transit to continually provide a gas-tight seal between the mixing zone and the zone of intake of powdered fuel to said screw conveyor, the improvement comprising means for rotatably mounting said housing and means for adjusting the relative motion between said housing and said screw conveyor during operation of said screw conveyor, said adjusting means comprising a motor and a transmission drivingly connected to said housing and being independent of the drive for said screw conveyor.

4. In an apparatus for placing finely divided solid fuels in suspension in a mixing zone in a gaseous medium with a driven screw conveyor in a housing for transporting the powdered fuel to said mixing zone and packing the particles of powdered fuel sufficiently tight against the inner surface of the housing for said screw conveyor during transit to continually provide a gas-tight seal between the mixing zone and the zone of intake of powdered fuel to said screw conveyor, the improvement comprising means for rotatably mounting said housing and reversible means for adjusting the relative motion between said housing and said screw conveyor during operation of said screw conveyor, said adjusting means comprising a motor and a transmission drivingly connected to said housing and being independent of the drive for said screw conveyor.

5. An apparatus for placing finely divided solid fuels in suspension in a gaseous medium in a mixing zone comprising a housing, a driven screw conveyor in said housing for transporting the powdered fuel to said mixing zone and packing the particles of powdered fuel sufficiently tight against the inner surface of the housing for said screw conveyor during transit to continually provide a gas-tight seal between the mixing zone and the zone of intake of powdered fuel to said screw conveyor, a drive mechanism for said screw-conveyor, means for rotatably mounting said housing, and means separate from said drive mechanism for the screw conveyor for imparting rotary motion to said housing to vary selectively its speed of rotation and its sense of rotation while the apparatus is functioning.

References Cited in the file of this patent

UNITED STATES PATENTS

| | | |
|---|---|---|
| 1,128,043 | Quigley | Feb. 9, 1915 |
| 2,545,140 | Escher | Mar. 13, 1951 |
| 2,621,083 | Daniels | Dec. 9, 1952 |